(12) United States Patent
Lu et al.

(10) Patent No.: US 11,682,793 B2
(45) Date of Patent: Jun. 20, 2023

(54) SINGLE-ION POLYMER ELECTROLYTE MOLECULAR DESIGN

(71) Applicant: FORD GLOBAL TECHNOLOGIES, LLC, Dearborn, MI (US)

(72) Inventors: Zijie Lu, Novi, MI (US); Andrew Robert Drews, Ann Arbor, MI (US); Xiaojiang Wang, Saline, MI (US)

(73) Assignee: FORD GLOBAL TECHNOLOGIES. LLC, Dearborn, MI (US)

( * ) Notice: Subject to any disclaimer, the term of this patent is extended or adjusted under 35 U.S.C. 154(b) by 276 days.

(21) Appl. No.: 17/081,304

(22) Filed: Oct. 27, 2020

(65) Prior Publication Data

US 2022/0131186 A1 Apr. 28, 2022

(51) Int. Cl.
| | |
|---|---|
| *H01M 10/0565* | (2010.01) |
| *C08G 81/00* | (2006.01) |
| *C08G 75/30* | (2006.01) |
| *H01M 10/0525* | (2010.01) |
| *C08J 5/18* | (2006.01) |

(52) U.S. Cl.
CPC ........ *H01M 10/0565* (2013.01); *C08G 75/30* (2013.01); *C08G 81/00* (2013.01); *C08J 5/18* (2013.01); *H01M 10/0525* (2013.01); *C08J 2381/10* (2013.01); *C08J 2387/00* (2013.01); *H01M 2300/0082* (2013.01)

(58) Field of Classification Search
CPC ......... H01M 10/0565; H01M 10/0525; H01M 2300/0082; C08G 75/30; C08G 81/00; C08J 5/18; C08J 2381/10; C08J 2387/00
See application file for complete search history.

(56) References Cited

U.S. PATENT DOCUMENTS

2015/0337064 A1* 11/2015 Yang .................. C08F 214/262
525/353

FOREIGN PATENT DOCUMENTS

| CN | 103509153 A | | 1/2014 |
|---|---|---|---|
| EP | 2063435 B1 | | 6/2011 |
| WO | WO9907676 | * | 2/1999 |

OTHER PUBLICATIONS

Geiculescu et. al. Journal of The Electrochemical Society, 151 (9) A1363-A1368 (2004) (Year: 2004).*
WO9907676MT (Year: 1999).*

(Continued)

*Primary Examiner* — Alexander Usyatinsky
(74) *Attorney, Agent, or Firm* — David B. Kelley; Brooks Kushman P.C.

(57) ABSTRACT

A single-ion polymer electrolyte has formula (I): R—[SO$_2$N (M)SO$_2$—X—]$_m$—SO$_3$Li (I). In formula (I), X may be an electron withdrawing group such as an aromatic group, substituted aromatic group, —(CF$_2$)$_n$—, —(CCl$_2$)$_n$—, —C$_6$H$_4$—, or —C$_6$H$_3$(NO$_2$)—. R may be a fluorinated alkyl, LiSO$_3$(CF$_2$)$_3$—, or an aromatic group, and M may be a metal cation. For the single-ion polymer electrolyte with formula (I), m may be an integer from 2 to 2000, and n may be an integer from 1 to 4.

11 Claims, 3 Drawing Sheets

(56) References Cited

OTHER PUBLICATIONS

Judez, X. et al., "Lithium Bis(fluorosulfonylimide/Poly(ethylene oxide) Polymer Electrolyte for All Solid-State Li—S Cell," J. Phys. Chem. Lett. 2017, 8, pp. 1956-1960.
Yandrasits, M. et al., "Increasing Fuel Cell Efficiency by Using Ultra-Low Equivalent Weight Ionomers," The Electrochemical Society Interface, Spring 2017, pp. 49-53.
Zhang, Q. et al., "Recent Advances in Solid Polymer Electrolytes for Lithium Batteries," Nano Research, 10, 4139 (2017), 36 pgs.

* cited by examiner

[1] Conductivity of H-form PFSA at 80 °C and 50% RH [*The Electrochem. Soc. Interface*, Spring 2017].
[2] Conductivity of Li-form PFSA (EW = 1100) soaked in 1:1 EC:PC at room temp.

SINGLE-ION POLYMER ELECTROLYTE MOLECULAR DESIGN

TECHNICAL FIELD

The present disclosure relates to a single-ion polymer electrolyte, and more particularly, a single-ion polymer electrolyte including a perfluoro bi(sulfonyl) imide and a sulfonic anion tether.

BACKGROUND

Solid state batteries, which replace liquid electrolytes with solid state electrolytes (SSEs), have attracted enormous attention due to performance factors and the potential for higher energy density. SSEs include various groups, such as solid polymeric electrolytes and inorganic solid electrolytes. Each group offers unique advantages, for example, solid polymer electrolytes offer the opportunity for light-weight and flexible separators. For some polymer electrolytes, conduction may include both anions and cations (dual ion polymer electrolytes), while others may conduct only one ion type, such as only cations, and are known as single-ion polymer electrolytes (SIPEs). SIPEs show improved performance over liquid electrolytes in several factors, including higher energy density by enabling use of a lithium metal anode, as well as manufacturing compatibility with current lithium ion battery technologies. Further, it is expected that polymeric electrolytes may be manufactured inexpensively and with mechanical properties that are suitable for high-volume manufacturing of cells.

One well-known solid polymer electrolyte is poly(ethylene oxide) (PEO) mixed with a small molecule lithium salt (e.g., LiPF6 or LiTFSI). Although PEO has many useful properties, its ionic conductivity at room-temperature is low (approximately $\sim 10^{-5}$ S/cm) and its use is limited to elevated temperatures, above about 60° C., which corresponds to the melting point of PEO. Furthermore, the dissociated anion of the salt incorporated into the PEO is mobile, leading to a reduced Li-ion transference number and undesirable concentration gradients. Thus, new SIPE materials with high Li+ conductivity, high thermal stability, high mechanical strength, and a wide voltage stability window are needed.

SUMMARY

According to one or more embodiments, a single-ion polymer electrolyte may have formula (I):

$$R-[SO_2N(M)SO_2-X-]_m-SO_3Li \qquad (I)$$

wherein X may be an electron withdrawing group including an aromatic group, substituted aromatic group, $-(CF_2)_n-$, $-(CCl_2)_n-$, $-C_6H_4-$, or $-C_6H_3(NO_2)-$; R may be a fluorinated alkyl, $LiSO_3(CF_2)_3-$, or an aromatic group; M may be a metal cation; m may be an integer from 2 to 2000; and n may be an integer from 1 to 4.

According to at least one embodiment, M may be selected from the group comprising Li+, H+, K+, Na+, Ag+, Mg+, and Al+. In a further embodiment, X may be $-(CF_2)_n-$. In one or more embodiments, the equivalent weight of the single-ion polymer electrolyte may be 200 g/mol to 400 g/mol. In further embodiments, the equivalent weight may be 299 g/mol to 350 g/mol. In at least one embodiment, m may be greater than 10 such that a film forms. In one or more embodiments, M may be lithium, and X may be $-(CF_2)_n-$. In at least one other embodiment, m may be less than or equal to 10, and the single-ion polymer electrolyte may be grafted onto a polymer backbone, cross-linked via a cross-linking agent, copolymerized with another polymer, or blended with another polymer. In one or more embodiments, the ionic conductivity of the single-ion polymer electrolyte in a solid-state lithium ion battery may be above 10'S/cm at room temperature. In certain embodiments, R may be $CF_3(CF_2)_2-$.

According to one or more embodiments, a single-ion polymer electrolyte includes perfluoro bi(sulfonyl) imide; a sulfonic anion tether; and an ionic group selected from the group comprising Li+, H+, K+, Na+, Ag+, Mg+, and Al+, wherein the perfluoro bis(sulfonyl)imide is a repeating unit, repeating n times, wherein n is an integer from 1 to 4.

According to at least one embodiment, the ionic conductivity of the single-ion polymer electrolyte in a solid-state battery may be above 10'S/cm. In certain embodiments, the ionic group is Li+. In one or more embodiments, the equivalent weight of the single-ion polymer electrolyte may be 200 g/mol to 400 g/mol.

According to one or more embodiment, a single-ion polymer electrolyte may have formula (II):

$$LiSO_3(CF_2)_3-[SO_2N(Li)SO_2-X-]_m-SO_3Li \qquad (II)$$

wherein X may be an electron withdrawing group including an aromatic group, substituted aromatic group, $-(CF_2)_n-$, $-(CCl_2)_n-$, $-C_6H_4-$, or $-C_6H_3(NO_2)-$; n may be an integer from 1 to 4; and m may be an integer from 2 to 2000.

According to at least one embodiment, X may be $-(CF_2)_n-$. In certain embodiments, the equivalent weight of the single-ion polymer electrolyte may be 200 g/mol to 400 g/mol. In one or more embodiments, m may be an integer above 10 such that a film forms. In other embodiments, m may be an integer from 2 to 10 such that an ionic liquid forms, and the ionic liquid may be grafted onto a polymer backbone, cross-linked via a cross-linking agent, copolymerized with another polymer, or blended with another polymer. In at least one embodiment, the ionic conductivity of the single-ion polymer electrolyte in a solid-state lithium ion battery may be above $10^{-4}$ S/cm.

DETAILED DESCRIPTION

Figure 1A:
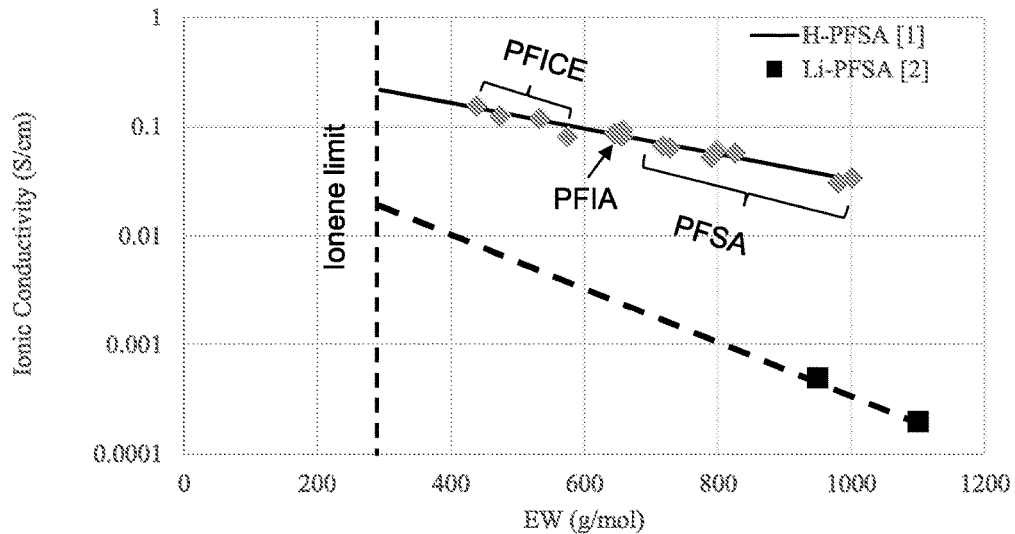
FIG. 1A is a schematic showing the side chain structure of conventional single-ion polymer electrolytes.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred. Furthermore, practice within the numerical limits stated is generally preferred.

Additionally, unless expressly stated to the contrary: all R groups (e.g. $R_i$, where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups; percent, "parts of" and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

In general practice, a solid-state battery consists of a positive electrode, a negative electrode and a separator element that prevents electrical shorting between the positive and negative electrodes. Conventionally, the positive electrode is referred to as the cathode, and the negative electrode is referred to as the anode, however it is also understood that the roles of the two electrodes switch depending on whether the cell is being charged or discharged. Nonetheless, the positive electrode will be referred to as the "cathode" and the negative electrode will be referred to as the "anode" throughout, and it is understood that they may switch based on the cell charging or discharging.

In conventional Li-ion cells, a liquid electrolyte is added that consists of organic solvents and a lithium salt. This liquid electrolyte is electronically non-conductive, but highly conductive to lithium ions. The liquid electrolyte permeates a porous separator and pores within the two electrodes, providing a complete pathway for conduction of lithium ions from one electrode, through the separator and to the opposing electrode. However, in a solid-state battery, the porous separator is replaced with a dense non-porous membrane. Like the liquid electrolyte, this solid electrolyte conducts lithium ions, but is not electronically conductive. In some solid-state batteries, the electrodes may be composites of an active material and a solid electrolyte phase, which may in some circumstances be the same solid electrolyte phase as the separator. In certain solid-state batteries, a liquid electrolyte may also be present in one or both electrodes, in addition to a solid electrolyte separator.

One type of solid polymer electrolyte conventionally used as a separator in hydrogen fuel cells is a perfluorosulfonic acid (PFSA) membrane. PFSA is a branched polymer that has different main chain and side chain structures. The main chain is similar to a PTFE backbone containing tetrafluoroethylene segments, as shown in FIG. 1A. The side chains provide the proton conduction by including polar sites that are favorable for a hydrogen ion to hop from chain to chain through the membrane. It is contemplated that the mobile protons ($H^+$) may be exchanged to $Li^+$, thus making PFSA a $Li^+$ conductor. Using $Li^+$-PFSA containing liquid plasticizers (e.g, PC, EC:PC, and the like) high ionic conductivities may be achieved. An intrinsic feature of the PFSA structure is the presence of polar ion clusters on the more mobile side chains instead of on the non-polar hydrophobic backbone of repeating ($—CF_2—$) units. The $Li^+$ ions coordinate loosely with the polar groups and may hop from side-chain to side-chain if the separation of the two sites is sufficiently small, even if only briefly during random motion of the side-chains. As a result, if the density of the polar sites on the polymer is too low, $Li^+$ sites may be far apart and hopping between sites may be restricted. In a branched polymer, the number of polar sites on a side-chain may vary, as may the length of the side chain and the degree of branching of the polymer. Thus, the mobility of the $Li^+$ ions in the PFSA solid depends on one or more of these factors.

Figure 1B:
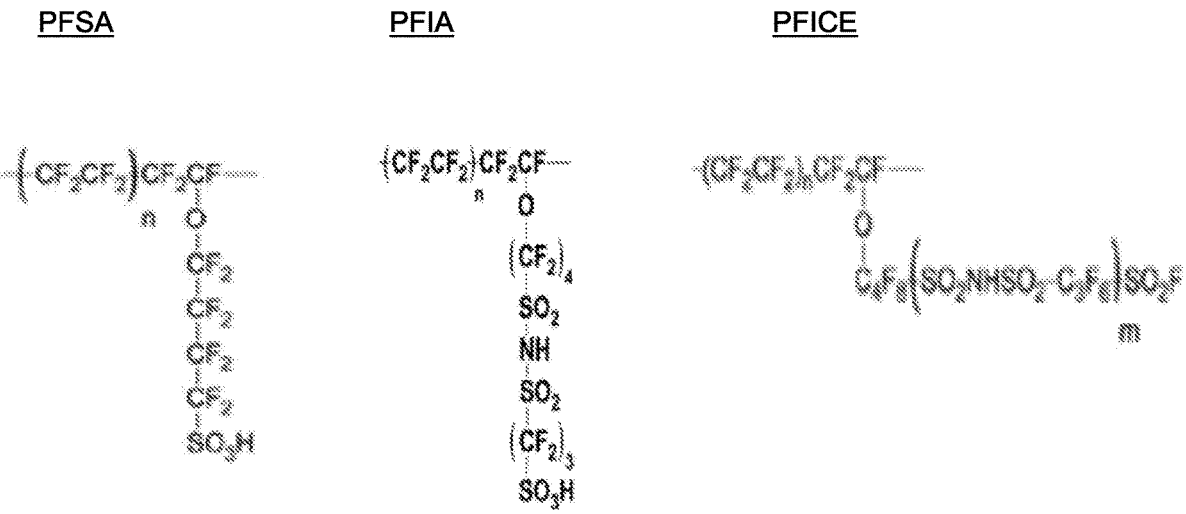
FIG. 1B a graph showing the ionic conductivity based on equivalent weight of the conventional single-ion polymer electrolytes of FIG. 1A.

As described above, one method of increasing ionic conductivity of a solid polymer electrolyte is by increasing the number of polar hopping sites on the polymer chain, which has been researched as an opportunity for proton conduction membranes. One conventional proton conduction membrane is the PFSA membrane with an equivalent molecular weight (EW) of 1100 g/mol, under the brand name of Nafion, developed by DuPont. In order to increase the proton conductivity, a perfluoro imide acid (PFIA) membrane was developed by 3M by adding a bis(sulfonyl) imide groups to each side chain, as illustrated in FIG. 1A. The membrane was further developed by adding multiple bis(sulfonyl) imide groups to the side chain and designated this new material perfluoro ionene chain extended (PFICE). However, PFICE is water soluble and hence, cannot be used as a separator in a proton exchange membrane for fuel cell applications, while PFIA is suitable for this use because of its insolubility in water. FIG. 1B shows the ionic conductivity of PFSA, PFIA, and PFICE with respect to the EW. FIG. 1B demonstrates that by adding one bis(sulfonyl) imide group on the side chain of PFSA, the new ionomer PFIA doubles the proton conductivity. The proton conductivity is further increased by adding more bis(sulfonyl) imide groups (PFICE). A linear relationship exists between the proton conductivity and EW (i.e., the number of bis(sulfonyl) imide groups on the side chain). Based on this correlation, the membrane can be extrapolated to a case where there is no longer a PTFE backbone, but simply a polymeric version of the bis(sulfonyl) imide side chain. This polymeric version would be the theoretical limit of this type of ionomer, which is an ionene. Extrapolating the conductivity data to this "ionene" limit (EW=293 g/mol), suggests that the proton conductivity might be increased by an additional ~50%. However, membranes of this nature are highly soluble in water and are thus incompatible with proton exchange fuel cells which necessarily produce water during operation.

In an analogy to the proton exchange membrane, it is contemplated that if the same polymer includes a dissociated Li-ion, a Li-ion conducting membrane may be produced. As such, according to one or more embodiments, it is contemplated that increasing the mobile Li-ion concentration in the polymer electrolyte may also benefit the Li-ion conductivity, just as it increased the proton conductivity and the development in the proton conduction membrane can thus be mimicked to create a $Li^+$ single ion conduction membrane. The basic functionality of the bis(sulfonyl) imide anion, which controls the degree of cation (e.g., $Li^+$) dissociation, is especially attractive since the $—SO_2N^-\ SO_2—$ anion is highly basic (therefore has high tendency to release $Li^+$). Linking electron withdrawing groups to bis(sulfonyl) imide will further increase its basicity and consequently increase $Li^+$ dissociation. Many groups have the electron withdrawing capability, such as, but not limited to, $—(CF_2)_n—$, $—(CCl_2)_n—$, $—C_6H_3(NO_2)—$. Among them, perfluoro bis(sulfonyl) imide groups, the combination of $—(CF_2)_n—$ and bis(sulfonyl) imide, are ideal for the additional basic functionality due to the strong electron withdrawing of the fluorocarbon and $SO_2$ segments. Notably, the basic strength of perfluoro bis(sulfonyl) imide anion is similar to that of perfluoro sulfonic anion, making it a suitable anion site for Li-ion. Perfluoro bis(sulfonyl) imide groups are also excellent chain extenders and can be added by reacting with anhydrous ammonia. This process can be repeated to extend the polymer chain as needed, as will be discussed in detail below.

According to one or more embodiments, like the extrapolation of the proton conduction membrane to its theoretical ionene, a Li-ion conducting polymer electrolyte with perfluoro bis(sulfonyl) imide segments instead of tetrafluoroethylene segments is contemplated. The ionene is composed of macromolecules in which perfluoro bis(sulfonyl) imide ionic groups constitute the main chain. Such an ionene has an EW of 200 to 400 g/mol and is expected to have an extremely high Li-ion conductivity (at least >10'S/cm at room temperature). For example, an ionene with EW of 299 g/mol has a chemical structure of $R—[SO_2N(Li)SO_2—(CF_2)_3]—SO_3Li$. As shown in FIG. 1B, extrapolating the ionic conductivity of the perfluorinated Li-ion conductor to its ionene limit indicates a (theoretical) ionic conductivity of about $2\times10^{-2}$ S/cm. Because a solid-state lithium ion battery is a non-aqueous environment, the previous concerns with solubility of the solid polymer are no longer relevant, and as such, realizing the ionene limit may be achievable. As such, according to one or more embodiments, a single-ion polymer electrolyte for use in solid-state batteries is provided. The single-ion polymer electrolyte includes a repeating unit of perfluoro bis(sulfonyl) imide, and is tethered at the polymer's end group with a sulfonic anion group on one or both ends. The single-ion polymer electrolyte may have structure (I) or (II):

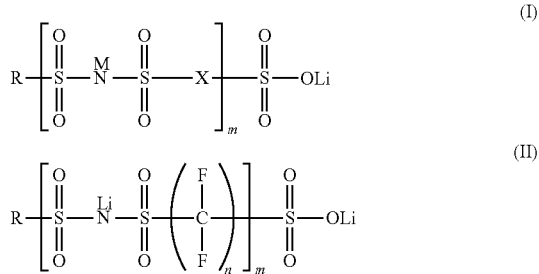

wherein M is a metal cation, such as, but not limited to $Li^+$, $H^+$, $K^+$, $Na^+$, Me, and $Al^{3+}$; X is an electron withdrawing group including an aromatic group, substituted aromatic group, $-(CF_2)_n-$, $-(CCl_2)_n-$, $-C_6H_4-$, $-C_6H_3(NO_2)-$, or other suitable electron withdrawing group; R is a fluorinated alkyl (e.g., $CF_3(CF_2)_2$), $LiSO_3(CF_2)_3-$, or an aromatic group; n is an integer from 1 to 4; and m is an integer from 2 to 2000. In certain embodiments, m is selected such that a solid film can be formed'. For example, in certain embodiments, m may be greater than 10 such that a film forms. In some embodiments, n is 3, and in some embodiments, n is 4. In certain embodiments, the single-ion polymer electrolyte may have formula (III):

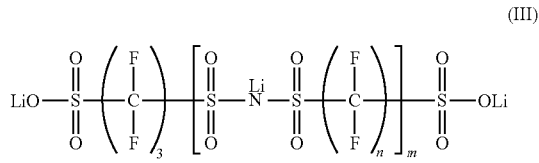

wherein n is an integer from 1 to 4; and m is an integer from 2 to 2000.

Although drawn structurally above, the corresponding formulas for structures (I)-(III) are also provided:

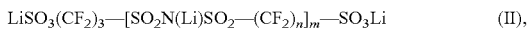

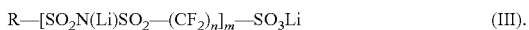

wherein M is a metal cation, such as, but not limited to $Li^+$, $H^+$, $K^+$, $Na^+$, $Ag^+$, $Mg^+$, and $Al^+$; X is an electron withdrawing group including an aromatic group, substituted aromatic group, $-(CF_2)_n-$, $-(CCl_2)_n-$, $-C_6H_4-$, $-C_6H_3(NO_2)-$, or other suitable electron withdrawing group; R is a fluorinated alkyl (e.g., $CF_3(CF_2)_2$), $LiSO_3(CF_2)_3-$, or an aromatic group; n is an integer from 1 to 4; and m is an integer from 2 to 2000.

In addition to high ionic conductivity, another advantage of this new type of SIPE with the perfluoro bis(sulfonyl) imide substitutions is the small activation energy for ion transport. This results from the fact the distance between cations (e.g. $Li^+$) in this polymer electrolyte is short enough that they may hop from one site to adjacent site without the assistance of polymer segment motion. This is notably different from conventional PEO-based polymer electrolytes which display a large activation energy (>0.5 eV). Thus, a small activation energy is expected, leading to a in wide temperature range for robust battery operation.

In embodiments where m is greater than 10, the single-ion polymer electrolyte is highly likely a self-forming film. In embodiments where m is less than or equal to 10 (i.e., 2 to 10), the single-ion polymer electrolyte may be an ionic liquid such that additional processing is necessary to form a standalone membrane. For example, the single-ion polymer electrolyte could be grafted onto a polymer backbone (e.g., PTFE or a hydrocarbon backbone), cross-linked via a cross-linking agent (e.g., PVDF-HFP), copolymerized with another polymer, or blended with another polymer, such as, but not limited to Li-PFSA or another suitable polymer having a good film formation capability. The single-ion polymer electrolyte containing the perfluoro bi(sulfonyl) imide groups is expected to have high ionic conductivity (about $1 \times 10^{-4} - 1 \times 10^{-2}$ S/cm), near unity in the cation transference number (approaching 1.0), high thermal stability (i.e., operating temperature is lower than the electrolyte melting point), a high electrical stability window (of greater than 5 V), and the ability to form a standalone membrane.

Figure 2:
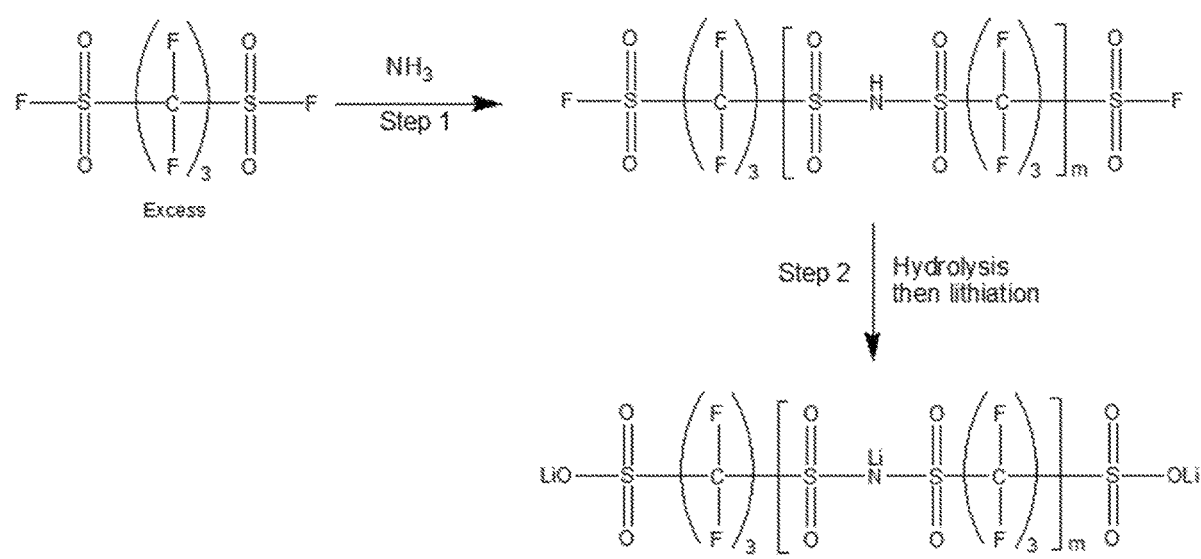
FIG. 2 is a schematic process showing the synthesis of a single-ion polymer electrolyte, according to an embodiment.

The single-ion polymer electrolyte may be synthesized using any suitable process for providing the bi(sulfonyl) imide repeating unit as well as the tethering sulfonic anion group. For example, in one embodiment, as shown in FIG. 2, the single-ion polymer electrolyte may be synthesized sequentially from 1,3-perfluorobutane disulfonyl fluoride ($FSO_2(CF_2)_3SO_2F$) as the starting material. Step 1 involves the polymerization of the $NH_3$ with excess amount of $FSO_2(CF_2)_3SO_2F$, which forms polymer $FSO_2(CF_2)_3-[SO_2N(H)SO_2-(CF_2)_3]_m-SO_2F$. In Step 2, the $FSO_2(CF_2)_3-[SO_2N(H)SO_2-(CF_2)_3]_m-SO_2F$ is hydrolyzed and then lithiated to form the single-ion polymer $LiSO_3(CF_2)_3-[SO_2N(Li)SO_2-(CF_2)_3]_m-SO_3Li$.

Figure 3:
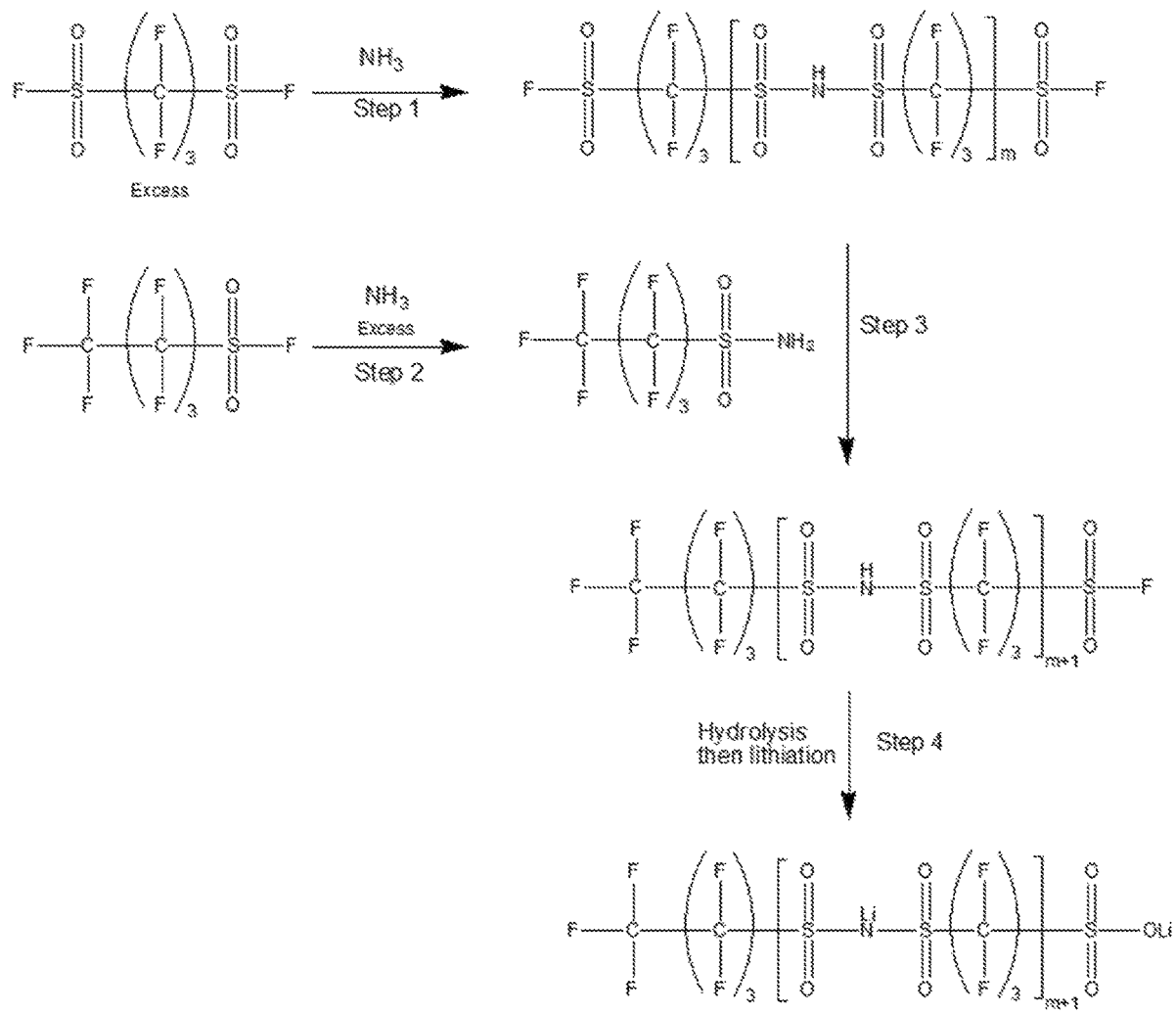
FIG. 3 is a schematic process showing the synthesis of a single-ion polymer electrolyte, according to another embodiment.

In another example, according to another embodiment, as shown in FIG. 3, the single-ion polymer electrolyte may be synthesized sequentially from perfluoro-1-butanesulfonyl fluoride ($CF_3(CF_2)_3SO_2F$) and 1,3-perfluorobutane disulfonyl fluoride ($FSO_2(CF_2)_3SO_2F$) as the starting materials. Step 1 involves the polymerization of the $NH_3$ with excess amount of $SO_2F$ $(CF_2)_3SO_2F$ to form polymer $FSO_2(CF_2)_3-[SO_2N(H)SO_2-(CF_2)_3]_m-SO_2F$. Step 2 involves the reaction of $CF_3(CF_2)_3SO_2F$ with excess amount of $NH_3$ to form $CF_3(CF_2)_3SO_2NH_2$. Step 3 involves the reaction of $FSO_2(CF_2)_3-[SO_2N(H)SO_2-(CF_2)_3]_m-SO_2F$ (product from step 1) and $CF_3(CF_2)_3SO_2NH_2$ (product from step 2) to form $CF_3(CF_2)_3-[SO_2N(H)SO_2-(CF_2)_3]_{m+1}-SO_2F$, which at step 4 is hydrolyzed and then lithiated to form the single-ion polymer $CF_3(CF_2)_3-[SO_2N(Li)SO_2-(CF_2)_3]_{m+1}-SO_2Li$.

According to one or more embodiments, a single-ion polymer electrolyte for solid-state lithium ion batteries includes a repeating unit of perfluoro bis(sulfonyl) imide. The ionomer forming the single-ion polymer electrolyte has an EW of about 200-400 g/mol. The imide groups are lithiated such that the ionic conductivity is more than 10'S/cm at room temperature.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A single-ion polymer electrolyte comprising formula (I):

$$R-[SO_2N(M)SO_2-X-]_m-SO_3Li \quad (I)$$

wherein X is an electron withdrawing group including an aromatic group, substituted aromatic group, $-(CF_2)_n-$, $-(CCl_2)_n-$, $-C_6H_4-$, or $-C_6H_3(NO_2)-$; R is $CF_3(CF_2)_2$, $LiSO_3(CF_2)_3-$, or an aromatic group; M is a metal cation; m is an integer from 2 to 10 such that an ionic liquid forms, and the ionic liquid is grafted onto a polymer backbone, cross-linked via a cross-linking agent, copolymerized with another polymer, or blended with another polymer; and n is an integer from 1 to 4.

2. The single-ion polymer electrolyte of claim 1, wherein M is selected from the group comprising $Li^+$, $K^+$, $Na^+$, $Ag^+$, $Mg^{2+}$, and $Al^{3+}$.

3. The single-ion polymer electrolyte of claim 2, wherein X is $-(CF_2)_n-$.

4. The single-ion polymer electrolyte of claim 2, wherein the single-ion polymer electrolyte has an equivalent weight of 200 g/mol to 400 g/mol.

5. The single-ion polymer electrolyte of claim 2, wherein the single-ion polymer electrolyte has an equivalent weight of 299 to 350 g/mol.

6. The single-ion polymer electrolyte of claim 1, wherein M is lithium, and X is $-(CF_2)_n-$.

7. The single-ion polymer electrolyte of claim 1, wherein the single-ion polymer electrolyte in a solid-state lithium ion battery has an ionic conductivity above $10^{-4}$ S/cm at room temperature.

8. A single-ion polymer electrolyte comprising formula (II):

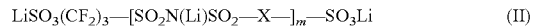

$$LiSO_3(CF_2)_3-[SO_2N(Li)SO_2-X-]_m-SO_3Li \quad (II)$$

wherein X is an aromatic group, substituted aromatic group, $-(CF_2)_n-$, $-(CCl_2)_n-$, $-C_6H_4-$, or $-C_6H_3(NO_2)-$; n is an integer from 1 to 4; and m is an integer from 2 to 10 such that an ionic liquid forms, and the ionic liquid is grafted onto a polymer backbone, cross-linked via a cross-linking agent, copolymerized with another polymer, or blended with another polymer.

9. The single-ion polymer electrolyte of claim 8, wherein X is $-(CF_2)_n-$.

10. The single-ion polymer electrolyte of claim 8 wherein the single-ion polymer electrolyte has an equivalent weight of 200 g/mol to 400 g/mol.

11. The single-ion polymer electrolyte of claim 8, wherein the single-ion polymer electrolyte in a solid-state lithium ion battery has an ionic conductivity above $10^{-4}$ S/cm.

* * * * *